United States Patent

Schilling et al.

[11] Patent Number: 5,613,586
[45] Date of Patent: Mar. 25, 1997

[54] ROTATIONAL CONTROL APPARATUS

[75] Inventors: Hugh K. Schilling, St. Paul; John B. Davis, Tonka Bay; Robert C. Bredt, Edina, all of Minn.

[73] Assignee: Horton, Inc., Minneapolis, Minn.

[21] Appl. No.: 201,783

[22] Filed: Feb. 25, 1994

[51] Int. Cl.$^6$ ............ F16D 29/00; F16D 27/01; F16D 25/0635

[52] U.S. Cl. ............ 192/48.3; 192/85 A; 192/85 AA; 310/105

[58] Field of Search .................. 192/48.2, 48.3, 192/84 PM, 70.17, 70.2, 85 A, 85 AA; 188/156; 310/105

[56] References Cited

U.S. PATENT DOCUMENTS

| | | |
|---|---|---|
| 726,536 | 4/1903 | Holz . |
| 1,136,279 | 4/1915 | Severy .................. 192/48.2 X |
| 1,306,784 | 6/1919 | Soames et al. . |
| 1,556,427 | 10/1925 | Coughtry . |
| 1,742,805 | 1/1930 | Carhart .................. 192/70.2 X |
| 1,935,581 | 11/1933 | Snow, Jr. . |
| 2,221,014 | 11/1940 | Williamson . |
| 2,241,242 | 5/1941 | Friedman . |
| 2,488,079 | 11/1949 | Sensaud deLavaud et al. . |
| 2,519,449 | 8/1950 | Findley . |
| 2,581,637 | 1/1952 | Danly et al. .................. 192/113.23 |
| 2,597,388 | 5/1952 | Sensaud de Lavaud . |
| 2,658,593 | 11/1953 | Doebeli .................. 192/48.2 |
| 2,661,148 | 12/1953 | Englander . |
| 2,679,604 | 5/1954 | Jaeschke . |
| 2,714,437 | 8/1955 | Spase .................. 192/70.2 |

(List continued on next page.)

FOREIGN PATENT DOCUMENTS

| | | |
|---|---|---|
| 0202749 | 11/1986 | European Pat. Off. . |
| 2355205 | 1/1978 | France . |
| 2375494 | 7/1978 | France . |
| 671285 | 2/1939 | Germany . |
| 1020242 | 11/1957 | Germany .................. 192/48.2 |
| 1020243 | 11/1957 | Germany .................. 192/84 PM |
| 1188191 | 3/1965 | Germany . |
| 1613060 | 1/1971 | Germany . |
| 2653459 | 6/1978 | Germany . |
| 2821973 | 11/1978 | Germany . |
| 3203143 | 8/1983 | Germany . |
| 3443523 | 6/1986 | Germany . |
| 4207710 | 9/1993 | Germany . |
| 59-226721 | 12/1984 | Japan . |
| 61-130630 | 6/1986 | Japan . |
| 390375 | 8/1965 | Switzerland . |
| 1077724 | 8/1967 | United Kingdom . |
| 1268444 | 3/1972 | United Kingdom . |
| 2054279 | 2/1981 | United Kingdom . |

*Primary Examiner*—Rodney H. Bonck
*Attorney, Agent, or Firm*—Peterson, Wicks, Nemer & Kamrath, P.A.

[57] ABSTRACT

Rotational control apparatus in the preferred forms of fan clutches (A) are shown including an eddy current drive (224). Specifically, the eddy current drive (224) includes a plurality of permanent magnets (226) mounted circumferentially spaced and with alternating polarity by a holder (228) to a radially extending surface (232) of a housing (62) rotatably mounted by a bearing (58) to the hub portion (24) of a friction disc (28). A magnetically conductive ring (242) is mounted on the opposite axial side of the friction disc (28) than the surface (34) engaged by a friction ring (86, 252) which is rotatably fixed but axially displaceable relative to the housing (62). In the embodiments shown, the friction ring (86, 252) is biased in a disengaged condition from the friction disc (28) by springs (138, 256) and is moved to an engaged condition by a fluid actuated piston (80). In one of the preferred forms, the friction ring (252) includes peripheral gear teeth (256) in slideable gearing relation with gear teeth (250) formed in the housing (62) and is formed of fiber brake material to act as a dampener between the friction disc (28) and the housing (62) to absorb torsional vibration. Thus, the housing (62) and the fan blades mounted thereto are driven with the friction disc (28) in its engaged condition and are driven at a rotational speed less than the speed of the friction disc (28) in its disengaged condition by the eddy current drive (224) and without separate controls for the eddy current drive (224).

22 Claims, 2 Drawing Sheets

U.S. PATENT DOCUMENTS

| | | |
|---|---|---|
| 2,732,921 | 1/1956 | Rabinow . |
| 2,902,612 | 9/1959 | Whearley ................................. 310/105 |
| 2,937,803 | 5/1960 | Cunningham . |
| 3,167,673 | 1/1965 | Miquel et al. . |
| 3,209,184 | 9/1965 | Woodward, Jr. . |
| 3,229,132 | 1/1966 | Cohen et al. . |
| 3,291,273 | 12/1966 | Hansen . |
| 3,353,641 | 11/1967 | Chana . |
| 3,382,384 | 5/1968 | Hulls . |
| 3,403,275 | 9/1968 | Little . |
| 3,450,910 | 6/1969 | Jaeschke et al. . |
| 3,456,141 | 7/1969 | Burgess . |
| 3,478,239 | 11/1969 | Jaeschke . |
| 3,488,535 | 1/1970 | Baermann . |
| 3,488,536 | 1/1970 | Baermann . |
| 3,566,168 | 2/1971 | Matsubara . |
| 3,601,641 | 8/1971 | Baermann . |
| 3,896,911 | 7/1975 | Beneke . |
| 3,974,408 | 8/1976 | Fehr et al. . |
| 4,094,393 | 6/1978 | Spokas . |
| 4,139,085 | 2/1979 | Kanbe et al. . |
| 4,378,061 | 3/1983 | Schierling et al. . |
| 4,400,638 | 8/1983 | Albrecht et al. . |
| 4,425,993 | 1/1984 | Schilling . |
| 4,446,391 | 5/1984 | Sekine et al. . |
| 4,488,627 | 12/1984 | Streich et al. . |
| 4,498,066 | 2/1985 | Fujiwara et al. . |
| 4,499,409 | 2/1985 | Bauer . |
| 4,508,985 | 4/1985 | Pavlik et al. . |
| 4,526,257 | 7/1985 | Mueller ................................. 192/48.2 |
| 4,540,381 | 9/1985 | Molloy et al. . |
| 4,555,239 | 11/1985 | Miranti ........................... 192/113.23 X |
| 4,564,775 | 1/1986 | Mazzorana . |
| 4,576,266 | 3/1986 | Schilling et al. . |
| 4,688,951 | 8/1987 | Guers . |
| 4,696,378 | 9/1987 | Brooks . |
| 4,718,526 | 1/1988 | Koitabashi . |
| 4,766,986 | 8/1988 | Dayen et al. ................... 192/113.21 X |
| 4,846,326 | 7/1989 | Tilton et al. . |
| 4,907,683 | 3/1990 | Patel ..................... 192/85 AA |
| 4,926,992 | 5/1990 | Linnig . |
| 4,989,708 | 2/1991 | Gaggermeier . |
| 4,997,074 | 3/1991 | Larson et al. ...................... 192/85 AA |
| 5,059,161 | 10/1991 | Bredt . |
| 5,226,517 | 7/1993 | Grochowski . |
| 5,234,090 | 8/1993 | Haka . |
| 5,238,095 | 8/1993 | Pedu . |
| 5,284,230 | 2/1994 | Takaki ........................... 192/113.23 X |
| 5,301,779 | 4/1994 | Nash ........................ 192/70.2 |

ROTATIONAL CONTROL APPARATUS

BACKGROUND

The present invention generally relates to rotational control apparatus such as clutches and brakes, relates particularly to clutches, relates more particularly to fan clutches, and relates specifically to fan clutches having multiple speed drives and/or which are shock resistant for high torsional and vibration conditions.

Figure 1:
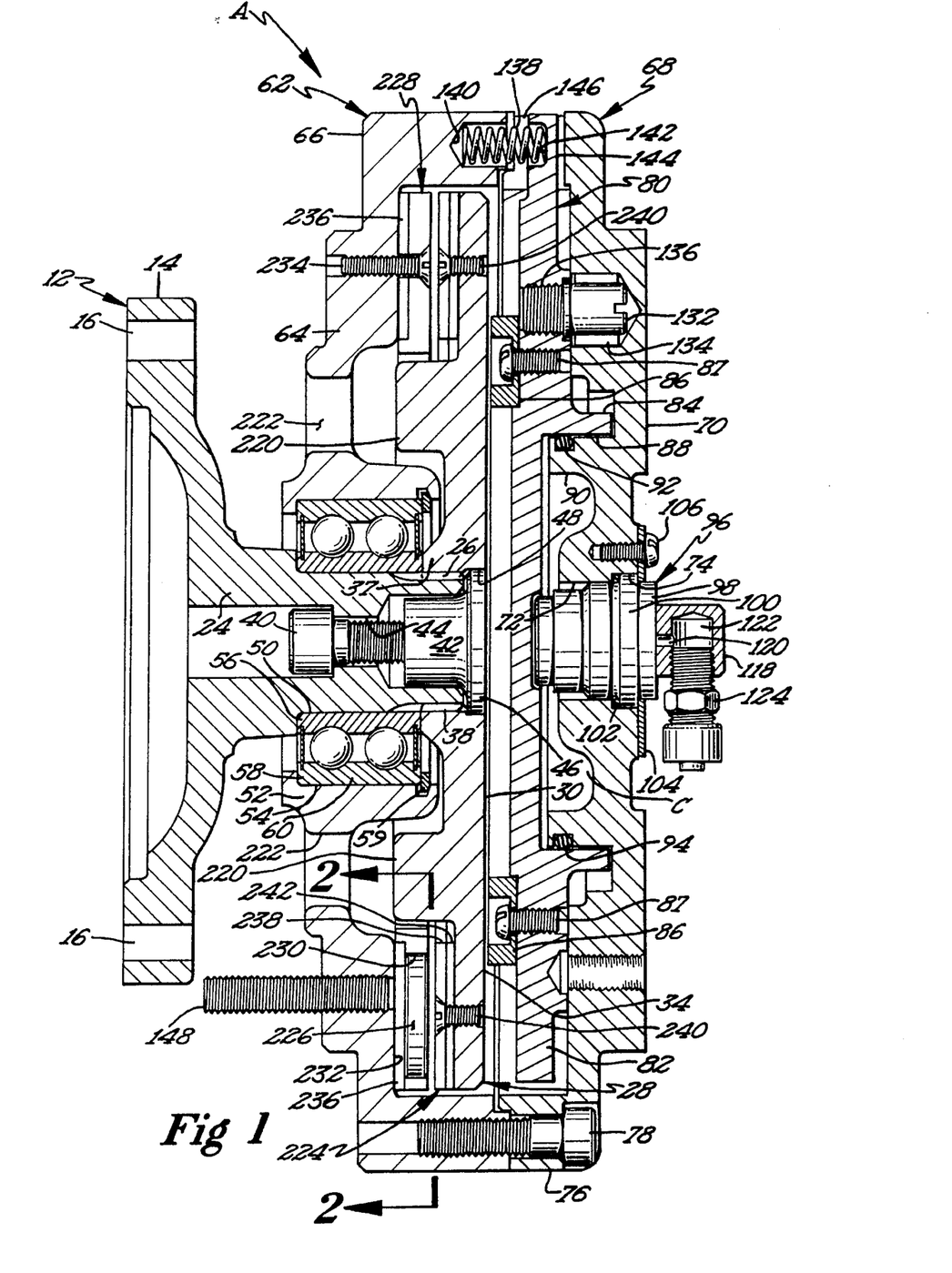
FIG. 1 shows a cross-sectional view of a rotational control apparatus in a first, preferred form of a fan clutch according to the preferred teachings of the present invention.
Figure 2:
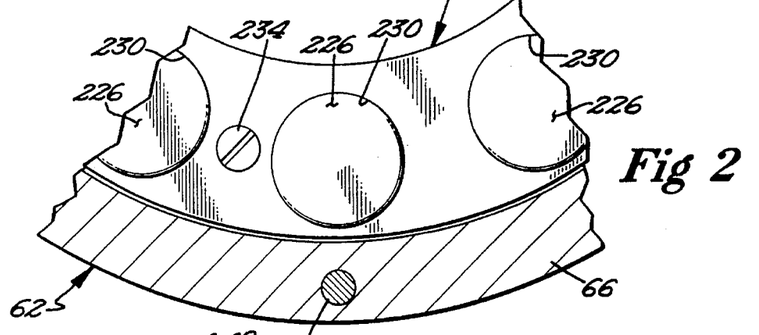
FIG. 2 shows a partial, cross-sectional view of the rotational control apparatus of FIG. 1 according to section line 2—2 of FIG. 1.
Figures 3, 4:
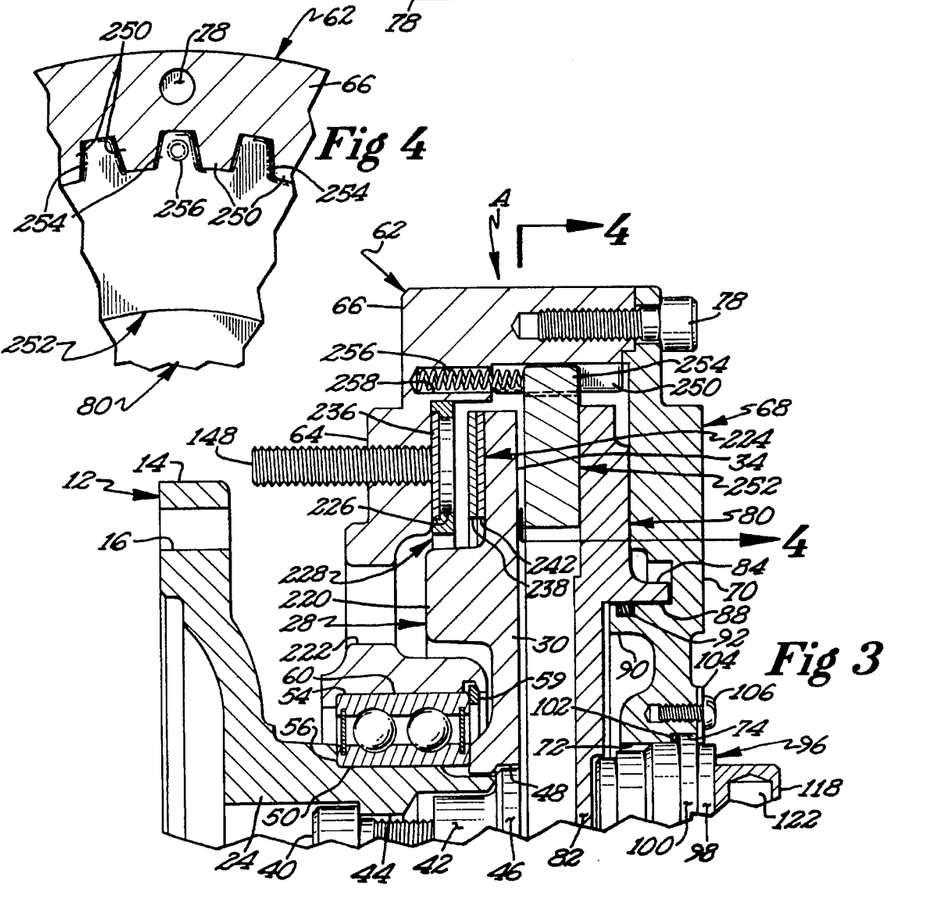
FIG. 3 shows a partial, cross-sectional view of a rotational control apparatus in a second, preferred form of a fan clutch according to the preferred teachings of the present invention.
FIG. 4 shows a partial, cross-sectional view of the rotational control apparatus of FIG. 3 according to section line 4—4 of FIG. 3.

Although fan clutches of the type shown in FIGS. 1–3 of U.S. Pat. No. 4,425,993 have proven to provide precise power, exceptional economy and dependable, long-lived durability, there exists a need to provide improvements to result in a further advantageous clutch. Specifically, a need exists to provide a multiple speed drive clutch for the fan blades mounted thereon. In particular, in a typical fan clutch application for a truck, while the truck is traveling down the road, the engine is operating at relatively high RPMs and air is rapidly passing by the radiator due to the movement of the truck. Thus, it is not necessary that the fan blades be driven at engine speed under these conditions, and it is advantageous to drive the fan blades at slower speeds for at least noise and power consumption reduction reasons. However, when the truck is parked and the engine is idling, maximum cooling is required such that the fan blades are driven at engine speed (or even faster than engine speed). Similarly, cooling requirements for other large engines such as for earth moving equipment or like applications and even for stationary applications vary according to various factors including ambient temperature, air flow, engine speed, and the like.

Further, the axially displaceable components of a fan clutch are subjected to high torsional and vibration conditions due to its interconnection to the crank shaft of the engine which is rotated by the reciprocating action of pistons. High torsional and vibration conditions result in loss of tolerance in the axially displaceable components in preventing relative rotation between the components and in the reduction of the clutch life. Thus, a need exists to provide a clutch which provides a dampening effect within the clutch to increase dependability and long-lived durability and having components which would be damaged by excessive torsional and vibration stress and/or loads being normally replaceable to increase economy.

SUMMARY

The present invention solves these needs and other problems in the field of rotational control apparatus and particularly fan clutches by providing, in the most preferred form, an eddy current drive in addition to an axially displaceable friction ring which engages with a friction disc, with the housing of the clutch being driven by the friction disc and ring when engaged and being driven by the eddy current drive when the friction disc and ring are disengaged. In a first aspect of the most preferred form of the present invention, the friction ring is axially displaced by fluid pressure introduced in the pressure cylinder defined by a piston for moving the piston and such that separate controls are not necessary for the eddy current drive.

In a further aspect of a preferred form of the present invention, one of the drive components of the eddy current drive is mounted on the friction disc while the other of the components is mounted on the housing to reduce the number of clutch components and minimize the overall axial length.

It is thus an object of the present invention to provide a novel rotational control apparatus.

It is further an object of the present invention to provide such a novel rotational control apparatus in the form of a fan clutch.

It is further an object of the present invention to provide such a novel rotational control apparatus having ease of serviceability.

It is further an object of the present invention to provide such a novel rotational control apparatus which includes a multiple speed drive.

It is further an object of the present invention to provide such a novel rotational control apparatus having reduced noise.

It is further an object of the present invention to provide such a novel rotational control apparatus having reduced squeal.

It is further an object of the present invention to provide such a novel rotational control apparatus having reduced power consumption.

It is further an object of the present invention to provide such a novel rotational control apparatus which is shock resistant for high torsional and vibration conditions.

It is further an object of the present invention to provide such a novel rotational control apparatus having an improved axially displaceable friction ring which provides a dampening effect within the apparatus.

It is further an object of the present invention to provide such a novel rotational control apparatus including components which would be damaged by torsional and vibration stress and/or loads to be normally replaceable.

It is further an object of the present invention to provide such a novel rotational control apparatus designed to be simple.

It is further an object of the present invention to provide such a novel rotational control apparatus which is reliable.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

The figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

Rotational control apparatus according to the preferred teachings of the present invention is shown in the drawings in the preferred form of a fan clutch and is generally designated A. In the most preferred embodiments of the present invention, clutch A is an improvement of the type shown and described in FIGS. 1–3 of U.S. Pat. No. 4,425,993. For purpose of explanation of the basic teachings of the present invention, the same numerals designate the same or similar parts in the present figures and the figures of U.S. Pat. No. 4,425,993. The description of the common numerals and clutch A may be found herein and in U.S. Pat. No. 4,425,993, which is hereby incorporated herein by reference.

Referring to the drawings in detail, fluid engaged spring released clutch A includes an annular mount 12 having an annular flange 14 which is formed with a series of spaced holes 16 for bolting or otherwise attaching annular mount 12 to a sheave or other driven member which is rotated about a clutch axis by a conventional mechanism (not shown) within the engine block. Flange 14 terminates radially inwardly in a hollow hub portion 24 formed with splines 26 thereon.

Further provided is a friction disc 28 including a circular main body portion 30 having an annular friction engageable surface or portion 34. Disc 28 is formed with an axial hollow hub 37 formed with internal splines 38 in engagement with splines 26 of hub portion 24. Mount 12 is secured and fixed in a splined relationship to body portion 30 of friction disc 28 by means of an axially mounted bolt 40 threadedly engaged in a clamping disc 42 through an axial hole 44 of hub portion 24.

Disc 42 has an annular flange portion 46 in secure engagement with an annular recess 48 formed in body portion 30. Hub portion 24 is formed with an external annular recess 50. A housing hub 52 is formed with a companion annular recess 54, with the inner race 56 of a bearing 58 press fit in recess 50 and the outer race 60 of bearing 58 press fit in recess 54. Bearing 58 is retained in recess 54 by means of a retaining ring 59 and in recess 50 by hub 37.

Hub 52 is part of a first outer shell housing 62, with hub 52 terminating in an annular and radially extending body portion 64 which terminates in an offset portion 66 located radially outward of friction disc 28 and extending axially from body portion 64 beyond surface 34 of friction disc 28. A second outer shell housing 68 includes an annular main body portion 70 formed with an axial hole 72 terminating outwardly in an annular recess 74. Main body portion 70 terminates radially outwardly in a right angular flange 76. First outer shell housing 62 is secured to second outer shell housing 68 by means of spaced bolts 78. Thus, housings 62 and 68 are rotatable relative to friction disc 28 by bearing 58 about the clutch axis.

An annular piston 80 includes a circular and center body portion 82 which terminates in an outwardly offset and radially disposed annular flange portion 84. An inner annular surface 88 of annular flange 84 forms a cylindrical surface. Formed internally of main body portion 70 of shell housing 68 is an annular flange portion 90 slideably positioned relative to surface 88 of flange 84. On the outer surface of portion 90 is formed an annular recess 92 in which is positioned an O-ring 94 in sealing engagement with surface 88 of flange 84 thereby forming a pressure cylinder C.

Positioned within axial hole 72 is a rotary air union 96 which includes a substantially cylindrical body 98 having an annular shoulder 100 which fits in annular recess 74 and sealed by an O-ring 102. Rotary air union 96 is secured in axial hole 72 and annular recess 74 by means of a circular flat ring 104 secured upon the outer surface of body portion 70 of second shell housing 68 by means of spaced bolts 106 and in abutment with and upon annular shoulder 100 of air union 96.

Rotatably received within cylindrical body 98 is a stationary air union portion 118 formed with an axial hole 120 which terminates in a right angularly disposed hole 122 connected by a union 124 to a fluid supply line, not shown. Air union portion 118 has mounted thereon a suitable bearing which is within air union body 98 whereby the entire clutch A may rotate about the clutch axis about stationary air union portion 118, with rotary air union 96 providing fluid communication with cylinder C.

A series of bolts 148 are threadedly engaged in first shell housing 62 and each extend through a hole in the spider hub portion of fan blades, not shown.

In the form shown in FIGS. 1 and 2, a friction ring 86 is mounted on portion 82 such as by screws 87 in axial alignment with frictional engagement portion 34 of friction disc 28. In the form shown in FIGS. 1 and 2, a series of spaced torque pins 132 are slideably mounted on one end in a bushing 134 which is secured by press fitting in body portion 70 of second shell housing 68. The other ends of torque pins 132 are threaded or otherwise secured in a hole 136 formed in piston 80. A series of spaced return springs 138 are mounted on one end in a hole 140 formed in offset portion 66 of first outer shell housing 62. The other ends of return springs 138 are mounted in a recess 142 formed in a tab 144 formed in the outer periphery of piston 80 and extending into a void 146 formed between shell housings 62 and 68. It will be seen that the springs 138 normally urge piston 80 and friction facing ring 86 thereon from friction portion 34 of friction disc 28.

Clutch A as described thus far is generally of the type shown and described in U.S. Pat. No. 4,425,993. However, it can be appreciated that other constructions may be applicable to utilize the teachings of the present invention.

In the most preferred form of the present invention, circumferentially spaced cooling fins 220 are integrally formed and extend axially from the axial side of body portion 30 opposite to friction engageable portion 34 and located radially intermediate hub 37 and the outer periphery of body portion 30. Circumferentially spaced air vent apertures 222 are formed in body portion 64 at a radial spacing from hub 52 corresponding to and in alignment with cooling fins 220.

In a further, preferred form of clutch A of the present invention as shown in FIGS. 3 and 4, offset portion 66 of housing 62 includes internal, axially extending gear teeth 250. A fiber friction ring 252 is further provided including axially extending gear teeth 254 on its outer periphery. Teeth 254 are in gearing relation with teeth 250. Thus, teeth 250 and 254 define interfitting portions formed on housing 62 and friction ring 252, respectively, to rotatively fix friction ring 252 to offset portion 66 and housing 62 but allow friction ring 252 to be axially displaceable relative to offset portion 66 and housing 62. Friction ring 252 is biased away from friction disc 28 by means of a series of springs 256. Springs 256 are mounted in one end of a hole 258 formed in offset portion 66 circumferentially intermediate teeth 250 such that springs 256 are within the radial extent of teeth 250. The other end of springs 256 abut with friction lining 252.

Clutch A according to the preferred teachings of the present invention further includes an eddy current drive 224 between housing 62 and friction disc 28. Specifically in the preferred form, drive 224 includes a plurality of circumferentially spaced permanent magnets 226 radially spaced from the rotation axis of housing 62 and friction disc 28. In the most preferred form, magnets 226 are in the form of circular discs and are radially oriented and held at circumferentially spaced locations with alternating polarity by an annular magnetic holder 228 including a plurality of apertures 230 formed therein for receipt and holding of magnets 226. Holder 228 is formed from generally nonmagnetic material such as aluminum for magnetically isolating magnets 226 in holder 228 from each other. In the most preferred form, holder 228 and magnets 226 mounted therein are mounted to an axially inner, radially oriented or extending surface 232 of body portion 64 of housing 62 spaced from air vent apertures 222 such as by axially extending screws 234. Sandwiched between surface 232 and holder 228 including magnets 226 is a ring 236 formed of magnetic flux conductive material such as steel, with screws 234 extending through suitable apertures formed in ring 236.

Drive 224 further includes a smooth ring 238 formed of electrically conductive material such as copper. In the most preferred form, ring 238 is radially oriented and is mounted such as by screws 240 to the axial surface of body portion 30 opposite to friction engageable portion 34 and spaced radially outward of fins 230 at a radial location corresponding to magnets 226. A ring 242 formed of magnetic flux conductive material such as steel is sandwiched between ring 238 and body portion 30, with screws 240 extending through suitable apertures formed in ring 242. Although magnets 226 in the most preferred form are mounted to housing 62 rather than friction disc 28, the components of eddy current drive 224 may be reversed, if desired. It should be appreciated, however, that the construction of clutch A according to the preferred teachings of the present invention of mounting of magnets 226 to housing 62 is believed to be advantageous. Specifically, considerable heat can be generated by slippage of friction disc 28 and friction ring 86 or 252. Placement of magnets 226 on housing 62 reduces conductive heating through friction disc 28 resulting from such slippage. Further, heat is also generated by the rotation of magnets 226 relative to rings 238 and 242. Housing 62 acts as a heat sink to draw heat away from magnets 226. Additionally, rotation of cooling fins 220 with friction disc 28 pulls air into housings 62 and 68 to provide cooling to eddy current drive 224 and specifically magnets 226. As the performance and life of magnets 226 may be detrimentally affected by heat, clutch A according to the preferred teachings of the present invention protects magnets 226 from excessive heat conditions.

In operation of clutch A and assuming mount 12 is being rotated by conventional means hereinbefore referred to, the fan blades are rotated about the axis of clutch A by introducing fluid pressure through rotary air union 96 into cylinder C which forces piston 80 in the direction towards friction disc 28 whereby friction ring 86 or 252 engages friction disc 28. As a result of the above, which is contrary to the urging of springs 138 or 256, housings 62 and 68 with the fan blades thereon are rotated generally at the rotational speed of mount 12 and friction disc 28. With the fluid pressure released, springs 138 or 256 urge friction ring 86 or 552 from engagement with friction disc 28 whereby friction ring 86 or 252 is separated or disengaged from friction disc 28. However, due to its mounting on friction disc 28, rings 238 and 242 rotate at the rotational speed of mount 12 and friction disc 28. Due to eddy current principles, forces between magnets 226 and ring 242 cause rotation of ring 242 and induce rotation of magnets 226 and holder 228 and housings 62 and 68. The rotational speed of housings 62 and 68 is less than the rotational speed of mount 12 and friction disc 28 due to the torque load placed upon housings 62 and 68 by the fan blades in the most preferred form. The rotational speed of housings 62 and 68 is then dependent upon the number and strength of magnets 226, the axial spacing between magnets 226 and rings 238 and 242, speed of rotation of mount 12 and friction disc 28, and the torque load placed upon housings 62 and 68.

It can then be appreciated that when greater cooling requirements exist such as at low engine RPMs, fluid pressure is introduced into cylinder C causing rotation of housings 62 and 68 and the fan blades thereon at the rotational speed of friction disc 28 which typically will be at engine speeds. However, if lesser cooling requirements exist such as at high engine RPMs, fluid pressure is released causing rotation of housings 62 and 68 and the fan blades thereon at rotational speed less than friction disc 28 through eddy current drive 224. It can further be appreciated that lower rotational speeds of the fan blades result in reduced power consumption and in reduced noise generation and thus is very advantageous.

It should then be noted that permanent magnet eddy current drives for fan clutches are known which provide for fan rotation at speeds less than engine speed but which do not provide direct drive with the engine speed. Further, electromagnetically operable clutches are known which provide for fan rotation at engine speed through a first electromagnetic clutch and at lower than engine speed through a second electromagnetic clutch via an eddy current coupling. However, persons skilled in the art did not recognize the synergistic results which are obtainable utilizing a permanent magnet eddy current drive in combination with a nonelectromagnetically controlled clutch and specifically with a fluid and particularly an air actuated clutch. In particular, it should be noted when clutch A of the present invention shown in the Figures is actuated in the most preferred form by the introduction of fluid pressure through rotary air union 96, clutch A of the present invention rotates the fan blades at engine speeds with eddy current drive 224 and specifically magnets 226 and holder 228 and also rings 238 and 242 rotating at engine speeds due to their connection to housing 62 and friction disc 28, respectively. Thus, the engagement of friction disc 28 with friction ring 86 or 252 overrides eddy current drive 224 due to the simultaneous rotation of magnets 226 and rings 238 and 242. Thus, clutch A of the present invention operates in the same manner as clutch A of U.S. Pat. No. 4,425,993 when friction ring 86 or 252 is axially displaced to engage friction disc 28. However, when friction ring 86 or 252 is axially displaced from friction disc 28, clutch A of the present invention continues to drive the fan blades through eddy current drive 224 whereas clutch A of U.S. Pat. No. 4,425,993 provides no driving connection to the fan blades. Specifically, due to the mounting of rings 238 and 242 to friction disc 28, rings 238 and 242 rotate at engine speed whether or not friction disc 28 is engaged by friction ring 86 or 252. Due to the magnetic attraction of magnets 226 to ring 242, magnets 226 and housing 62 to which they are mounted are driven and rotate about the clutch axis at a speed less than that of friction disc 28 or in other words at less than engine speed due to the torque load placed on housing 62 by the fan blades. Thus, clutch A of the present invention provides cooling at all times and specifically whether or not friction disc 86 or 252 engages friction disc 28. It should further be appreciated that no separate controls or other actuation are required for eddy current drive 224 such that clutch A of the present invention can be easily substituted in prior installations utilizing clutch A of the type disclosed in U.S. Pat. No. 4,425,993 or the like. In particular, no electric controls such as would be necessary for electromagnetically operable drives are required according to the preferred teachings of the present invention. Specifically, when fluid actuated, clutch A of the present invention including eddy current drive 224 has the same operation as clutch A of U.S. Pat. No. 4,425,993 which does not include the eddy current drive. However, in the absence of fluid pressure and without actuation of any kind, eddy current drive 224 is then revealed in clutch A of the present invention to drive and rotate the fan blades rather than to simply let the fan blades be rotationally free as in clutch A of U.S. Pat. No. 4,425,993.

Furthermore, the particular construction of clutch A according to the teachings of the present invention is believed to be particularly advantageous. In this regard, clutch A of the present invention obtains similar advantages as those obtained by clutch A of U.S. Pat. No. 4,425,993. Additionally, eddy current drive 224 is included inside of housings 62 and 68 and is protected thereby from the environment or other outside forces. Even when housing 68 is removed from housing 62 to allow replacement of friction ring 86 or 252, eddy current drive 224 is generally enclosed by housing 62 and friction disc 28 which typically remain in an assembled condition during replacement of friction ring 86 or 252. Further, eddy current drive 224 is included inside of clutch A with minimal or no increase in axial length and specifically without requiring the addition of further disc or other mounting components. Specifically, magnets 226, holder 228, and ring 236 are mounted to housing 62, and rings 238 and 242 are mounted to friction disc 28, with housing 62 and friction disc 28 being necessary components for providing direct drive actuation through friction ring 86 or 252.

It should be noted that clutch A according to the preferred teachings of the present invention has a construction which is very simple in nature, lends itself to very economical manufacturing, and is very durable.

It should also be noted that the construction allows a single bearing 58 and specifically provides rigidity which braces outer race 60 of bearing 58 by supporting housings 62 and 68 through the engagement of friction disc 28 and friction ring 86 or 252 by directing load forces to friction disc 28 which in turn is directly connected to the rigid support which is the shaft or other rotatable member that mounts the entire clutch A.

Clutch A of the type as shown in FIGS. 3 and 4 is further believed to be particularly advantageous. Specifically, when clutch A is utilized in its preferred form as a fan clutch mounted on the crank shaft of an engine such as, in the preferred form, a diesel engine, clutch A is subjected to tremendous vibration stress or loads due to the torsional modes set up by the reciprocating action of the pistons of the engine. This torsional vibration causes constant clatter in the axially displaceable components of the clutch. When the components allowing axial displacement are formed of metal which typically is cast iron or aluminum with an anodized hard coat surface, this constant clatter in the axially displaceable, metal components results in the development of a very sloppy fit in a relatively short period of time thus reducing the life of the clutch. According to the preferred teachings of the present invention, use of fiber friction ring 252 acts as a dampener between housing 62 and friction disc 28. Specifically, friction ring 252 is formed of friction brake material that is resilient enough to absorb the torsional vibration and reform itself to its original condition to withstand the punishment of vibration stress or loads due to the torsional modes set up by the reciprocating action of the pistons of an engine. It can be appreciated that friction ring 252 can be inexpensively fabricated at the desired axial thickness to provide teeth 254 with the necessary bearing surface with teeth 250 to transfer the desired torque levels without damaging teeth 254. It should further be appreciated that in the event of excessive vibration stress or loading, failure will occur in teeth 254 of fiber friction ring 252 and not in the metal components such as teeth 250, housings 62 and 68 or friction disc 28, with friction ring 252 being a normally replaceable part due to frictional wear. It can then be appreciated that torque pins 132, bushings 134, and holes 136 are not required in clutch A of FIGS. 3 and 4 which are especially prone to the development of sloppy fits, and also reducing the complexity and weight of clutch A of FIGS. 3 and 4.

Now that the basic teachings of the present invention have been explained, many extensions and variations will be obvious to one having ordinary skill in the art. For example, although clutch A is shown in FIGS. 3 and 4 in the most preferred form including a multiple speed drive and specifically eddy current drive 224 and is believed to produce synergistic results, it can be appreciated that clutch A of FIGS. 3 and 4 could be manufactured without a multiple speed drive.

Further, clutch A of FIGS. 3 and 4 could be easily changed to be spring engaged and fluid released. As an example, friction disc 28 could be arranged to contact the other side of friction ring 252 which is biased by springs to engage friction disc 28 and which is disengaged by fingers coming out from piston 80 and radially spaced outwardly of friction disc 28.

Likewise, although shown and described for use as a fan clutch, clutch A and especially the clutch of the form of FIGS. 3 and 4, according to the teachings of the present invention, may be utilized in other applications such as, but not limited to, for driving an alternator, an air conditioner, or the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Rotational control apparatus comprising, in combination: a friction disc rotatable about an axis, with the friction disc having a first surface and a second, opposing surface; an output, with the friction disc being rotatable relative to the output about the axis, with the output having a friction ring for engagement with the first surface of the friction disc and a surface parallel to but spaced from the second surface of the friction disc; means for rotatably fixing the friction ring to the output while allowing the friction ring to be axially displaceable relative to the output between an engaged condition and a disengaged condition with the friction disc; means for moving the friction ring between the engaged and disengaged condition; and an eddy current drive including permanent magnets mounted to one of the second surface of the friction disc and the surface of the output and a ring of magnetic material mounted to the other of the second surface of the friction disc and the surface of the output, with the output being driven either with the friction disc when the friction ring is in the engaged condition or at a rotational speed less than the friction disc when the friction ring is in the disengaged condition by the eddy current drivel with the output being in the form of first and second shell housings secured together to define an interior, with the friction disc, the friction ring and the eddy current drive located inside the interior of the first and second shell housings and protected thereby from the environment or other outside forces.

2. The rotational control apparatus of claim 1 wherein the second surface of the friction disc further includes cooling fins spaced from the eddy current drive for cooling the eddy current drive.

3. The rotational control apparatus of claim 2 wherein the output includes cooling apertures spaced from the surface of the output corresponding to and in alignment with the cooling fins of the friction disc.

4. The rotational control apparatus of claim 3 wherein the second surface of the friction disc and the surface of the output are radially oriented, with the permanent magnets being radially oriented and the ring being radially oriented with relatively flat axial surfaces.

5. The rotational control apparatus of claim 1 further comprising, in combination: a hub portion, with the friction disc being fixed to the hub portion, with the output including an annular and radially extending body portion including a hub, with the hub of the body portion being rotatably mounted on the hub portion, with the surface of the output formed on the body portion.

6. The rotational control apparatus of claim 5 wherein the output further includes an offset portion located radially outward of the friction disc and extending axially from the body portion beyond the first surface of the friction disc, with the moving means being carried by the offset portion.

7. The rotational control apparatus of claim 6 wherein the axially displaceable, rotatably fixing means comprises, in combination: teeth formed in the offset portion and teeth formed in the friction ring for slideably receiving the teeth of the offset portion.

8. The rotational control apparatus of claim 7 wherein the moving means comprises, in combination: a piston, with the output including an annular cylinder having an outer surface, with the piston having a circular, center body portion and an annular flange including an inner cylindrical surface terminating in the circular, center body portion, with the inner surface of the annular flange being reciprocally received and mounted on the annular cylinder to form a pressure cylinder; and means for providing fluid pressure into the pressure cylinder for moving the piston relative to the pressure cylinder.

9. The rotational control apparatus of claim 8 wherein the moving means further comprises, in combination: means for biasing the piston against movement by the fluid pressure providing means.

10. The rotational control apparatus of claim 7 wherein a single friction disc is provided formed of material which acts like a dampener between the friction disc and the output and absorbs torsional vibration to reduce its transmission between the friction disc and the housing.

11. The rotational control apparatus of claim 10 wherein the friction lining is formed of fiber.

12. The rotational control apparatus of claim 1 wherein the moving means comprises, in combination: means for biasing the friction ring to the disengaged condition.

13. The rotational control apparatus of claim 1 wherein one of the permanent magnets and the ring of magnetic material is mounted directly to the friction disc.

14. Rotational control apparatus comprising, in combination: a friction disc rotatable about an axis; a housing rotatable relative to the friction disc about the axis; a friction ring; means for rotatably fixing the friction ring to the housing while allowing the friction ring to be axially displaceable relative to the housing between an engaged condition and a disengaged condition with the friction disc; a piston reciprocally mounted to the housing and defining a pressure cylinder; means for providing fluid pressure into the pressure cylinder for moving the piston to axially displace the friction ring in a first direction; means for moving the piston opposite to the first direction; and an eddy current drive including permanent magnets and a ring of magnetic material, with one of the permanent magnets and the ring of magnetic material being rotatably fixed to the friction disc and the other of the permanent magnets and the ring of magnetic material being rotatably fixed to the housing, with the housing being driven either with the friction disc when the friction ring is in the engaged condition or at a rotational speed less than the friction disc when the friction ring is in the disengaged condition by the eddy current drive and without separate controls for the eddy current drive whereby the housing is driven at all times when the friction disc is rotated about the axis with the rotational speed of the housing being controlled by and solely dependent upon the movement condition of the friction ring.

15. The rotational control apparatus of claim 14 wherein one of the permanent magnets and the ring of magnetic material is mounted to the friction disc.

16. The rotational control apparatus of claim 15 wherein the permanent magnets and the ring of magnetic material are radially oriented. magnets mounted to one of the friction disc and the surface of the output and a ring of magnetic material mounted to the other of the friction disc and the surface of the output, with the output being driven either with the friction disc when the friction ring is in the engaged condition or at a rotational speed less than the friction disc when the friction ring is in the disengaged condition by the eddy current drive whereby the output is driven at all times when the friction disc is rotated about the axis and controlled by and solely dependent upon the movement condition of the friction ring and whereby the mounting of the eddy current drive to the output and the friction disc reduces the complexity of the apparatus.

17. Rotational control apparatus comprising, in combination: a friction disc rotatable about an axis, with the friction disc having a first surface; an output, with the friction disc being rotatable relative to the output about the axis, with the output having a friction ring for engagement with the friction disc and a surface; means for rotatably fixing the friction ring to the output while allowing the friction ring to be axially displaceable relative to the output between an engaged condition and a disengaged condition with the friction disc; means for moving the friction ring between the engaged and disengaged condition; and an eddy current drive including permanent magnets mounted to one of the friction disc and the surface of the output and a ring of magnetic material mounted to the other of the friction disc and the surface of the output, with the output being driven either with the friction disc when the friction ring is in the engaged condition or at a rotational speed less than the friction disc when the friction ring is in the disengaged condition by the eddy current drive whereby the output is driven when the friction disc is rotated about the axis and controlled by and solely dependent upon the movement Condition of the friction ring; wherein the moving means comprises, in combination: a piston; and a cylinder formed in the output, with the piston being slideable relative to the cylinder to form a pressure cylinder, with one of the piston and the cylinder mounted to the friction ring; and means for providing fluid pressure into the pressure cylinder for moving the piston relative to the cylinder.

18. The rotational control apparatus of claim 17 wherein the moving means further comprises, in combination: means for biasing the piston against movement by the fluid pressure providing means.

19. The rotational control apparatus of claim 17 wherein the cylinder formed in the output is annular and has an outer surface, with the piston having a circular, center body portion and an annular flange including an inner cylindrical surface terminating in the circular, center body portion, with the inner surface of the annular flange being reciprocally received and mounted on the annular cylinder to form the pressure cylinder.

20. The rotational control apparatus of claim 17 wherein the output is driven at all times.

21. Rotational control apparatus comprising, in combination: a friction disc rotatable about an axis, with the friction disc having a first surface and a second, opposing surface; an output, with the friction being rotatable relative to the output about the axis, with the output having a friction ring for engagement with the first surface of the friction disc and a surface parallel to but spaced from the second surface of the friction disc; means for rotatably fixing the friction ring to the output while allowing the friction ring to be axially displaceable relative to the output between an engaged condition and a disengaged condition with the friction disc; means for moving the friction ring between the engaged and disengaged condition; and an eddy current drive including permanent magnets mounted to one of the second surface of the friction disc and the surface of the output and a ring of magnetic material mounted to the other of the second surface of the friction disc and the surface of the output, with the output being driven either with the friction disc when the friction ring is in the engaged condition or at a rotational speed less than the friction disc when the friction ring is in the disengaged condition by the eddy current drive, wherein the second surface of the friction disc further includes cooling fins spaced from the eddy current drive for cooling the eddy current drive.

22. The rotational control apparatus of claim 21 wherein the output includes cooling apertures spaced from the surface of the housing corresponding to and in alignment with the cooling fins of the friction disc.

\* \* \* \* \*

UNITED STATES PATENT AND TRADEMARK OFFICE
CERTIFICATE OF CORRECTION

PATENT NO. : 5,613,586

DATED : March 25, 1997

INVENTOR(S) : Hugh K. Schilling et al.

It is certified that error appears in the above-identified patent and that said Letters Patent is hereby corrected as shown below:

Column 6, line 9, cancel "552" and substitute therefor --252--.

Column 9, line 19, cancel "drivel" and substitute therefor --drive--.

Column 10, lines 47-59, cancel "magnets mounted ..." to and including "... the apparatus.".

Column 11, line 14, cancel "Condition" and substitute therefor --condition--.

Signed and Sealed this

Twenty-fourth Day of June, 1997

Attest:

Attesting Officer

BRUCE LEHMAN

Commissioner of Patents and Trademarks